United States Patent [19]
Woodward

[11] 3,929,281
[45] Dec. 30, 1975

[54] FLUID MIXING VALVES

[75] Inventor: Alan Francis Woodward, Hockley, England

[73] Assignee: Barking Brassware Company Limited, Barking, England

[22] Filed: Nov. 5, 1973

[21] Appl. No.: 412,966

[30] Foreign Application Priority Data
Nov. 10, 1972 United Kingdom............... 52051/72

[52] U.S. Cl................ 236/12 R; 137/114; 137/613; 137/90
[51] Int. Cl............................................. B05d 23/13
[58] Field of Search ........... 137/114, 457, 607, 613, 137/627.5, 98; 236/12 R

[56] References Cited
UNITED STATES PATENTS

| | | | |
|---|---|---|---|
| 2,145,115 | 1/1939 | Hoopes | 236/12 R |
| 2,308,127 | 1/1943 | Symmons | 137/99 |
| 2,308,127 | 1/1943 | Symmons | 137/607 X |
| 2,679,861 | 6/1954 | Campbell | 137/607 |
| 2,767,924 | 10/1956 | Barker | 251/304 X |
| 2,977,989 | 4/1961 | Meynell | 137/613 X |
| 3,099,996 | 8/1963 | Symmons | 137/607 X |
| 3,364,948 | 1/1968 | Seiffert | 137/607 X |
| 3,768,728 | 10/1973 | Blank | 236/12 R |
| 3,792,812 | 2/1974 | Knapp | 236/12 R |

FOREIGN PATENTS OR APPLICATIONS

| | | | |
|---|---|---|---|
| 523,550 | 4/1954 | Belgium | 137/607 |
| 528,080 | 9/1930 | Germany | 137/607 |
| 340,019 | 8/1920 | Germany | 137/607 |
| 969,925 | 9/1964 | United Kingdom | 236/12 R |

Primary Examiner—Charles J. Myhre
Assistant Examiner—Ira S. Lazarus
Attorney, Agent, or Firm—Brisebois & Kruger

[57] ABSTRACT

To reduce the possibility of discharging water at scalding temperature in the event of thermostat failure or sudden loss and re-establishment of hot water supply, a duplex valve regulating the mixing of hot and cold water for a shower is provided with an auxiliary valve member which has little effect in normal operation but which is arranged to shut-off the hot water flow if the duplex valve moves to shut-off the cold water flow.

4 Claims, 2 Drawing Figures

FLUID MIXING VALVES

This invention relates to fluid mixing valves.

The invention is concerned with increasing the effectiveness of fluid mixing valves which incorporate some means for automatically compensating for variation in a parameter of fluid flowing into or out of the valve. For example, a valve for mixing hot and cold water for a shower may incorporate a temperature-responsive device arranged to adjust the relative proportions of hot and cold water admitted to the valve so as to maintain a substantially constant outlet temperature. However the temperature-responsive device will have a finite response time and the valve may be unable to prevent transient supply fluctuations from causing a temporary outlet of water at scalding temperature.

According to the present invention a mixing valve for mixing first and second fluids comprises in combination 1. an inlet for the first fluid,
2. an inlet for the second fluid,
3. an outlet for the mixed fluids,
4. a main valve member located between said inlets and movable to vary fluid flow through each said inlet in inverse relation to fluid flow through the other inlet,
5. control means including a thermostatic device connected to said main valve for controlling the position thereof to vary said fluid flows,
6. an auxiliary valve member carried by said main valve member for movement therewith,
7. said second inlet being located between said main valve member and said auxiliary valve member whereby fluid flow through said second inlet is controlled by said auxiliary valve member only when fluid flow through the first inlet falls below a predetermined rate after which fluid flow through the second inlet is controlled by said auxiliary valve in accordance with fluid flow through said first inlet, and
8. further valve means operable by said control means for controlling the flow of fluid through said outlet.

In one arrangement the inlets face each other and the main valve member is a duplex valve member movable normally to the inlets, the first inlet including a neck portion providing a seating for the duplex valve member, and the auxiliary valve member being disposed on the opposite side of the neck portion from the duplex valve member.

The auxiliary valve member may be arranged substantially to close the first inlet by moving at least partially into the said neck.

In an embodiment of the invention described below the control means includes a thermostat responsive to mixed fluid temperature, but it will be appreciated that the fluid flowing into the valve might be sensed rather than mixed fluid. The thermostat is conveniently disposed between the main valve member and a control member for regulating the flow of mixed fluid from the valve.

By way of example only, one embodiment of the invention will now be described with reference to the accompanying drawing in which.

Figure 1:
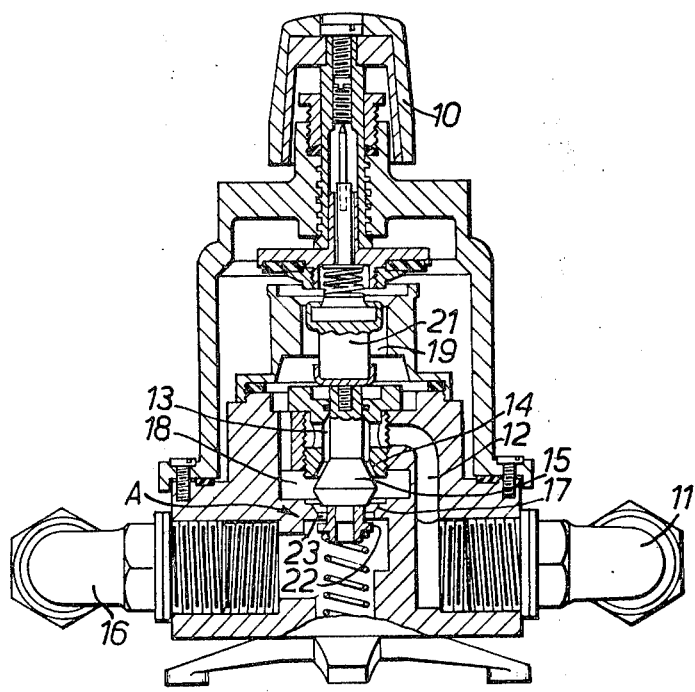
FIG. 1 is a cross-sectional view through a complete valve.
Figure 2:
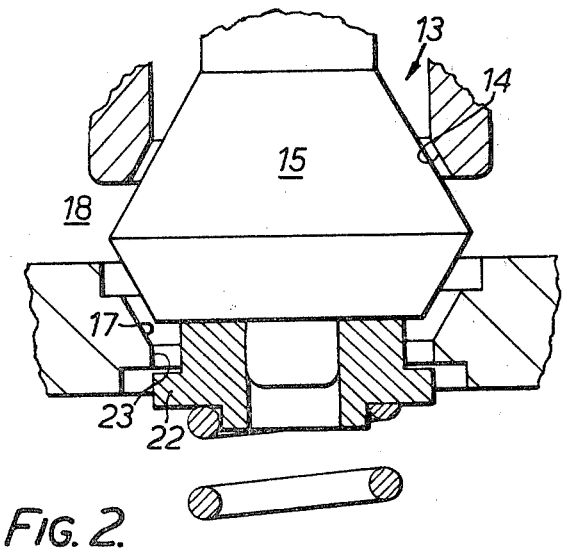
FIG. 2 is a cross-sectional view showing a detail of FIG. 1 and indicating the distinction between the valve of the present invention and a previously known valve.

Although the whole valve is shown in FIG. 1 a complete description of the operation of the whole valve is not given in this specification because it is readily available from U.K. Pat. specification No. 1,108,580. The present valve differs from that of specification No. 1,108,580 in the region indicated by the arrow A of FIG. 1, and this region is shown in more detail in FIG. 2.

The following brief explanation is intended to give sufficient understanding of the operation of the valve as a whole for understanding of the present invention. Cold water is supplied to a cold water connection 11, and from there is passed through a passage 12 to an annular chamber 13 immediately above a conical valve seating 14. The opening formed by the valve seating 14 can be controlled by the position of a duplex valve member 15 which has a conical upper surface corresponding to the conical valve seating 14. Hot water is supplied to the valve through a connection 16 and the hot water flow rate is normally controlled by the interaction between a conical valve seating 17 and a corresponding lower conical face of the duplex valve means 15. Thus, hot and cold water in proportions determined by the position of the duplex valve member, flows into a annular mixing chamber 18 where it is mixed to form a supply of water at an intermediate temperature. This mixed water then flows through a cavity 19 containing a temperature responsive unit 21, and from there flows out of the valve for use.

In normal use the vertical position of the duplex valve member 15 between its upper and lower seats 14 and 17 is controlled by the temperature responsive element 21 and a manual setting device in the form of a control knob 10. The temperature responsive device senses changes in mixed water temperature caused by variations in supply pressures and temperatures and operates to give a stream of outlet water which is at a temperature which has been compensated for such variations.

In accordance with the present invention there is provided a circular auxiliary valve member 22 which in the position shown lies below a neck-like inlet orifice 23 which is positioned immediately below the hot water valve seating 17. The auxiliary valve member 22 is secured to the duplex valve member 15 for movement therewith.

In operation the duplex valve member is movable between an uppermost position where it bears against the cold water inlet seating 14 and a lowermost position in which it completely closes off the hot water inlet seating 17. In the lower part of the range of movement of the duplex valve member, the auxiliary valve member 22 lies well clear of the orifice 23 and has no pratical effect on the operation of the valve. However, as the duplex valve member approaches its uppermost position, the auxiliary valve member 22 enters the orifice 23 and substantially closes it. The effect of this is that when the duplex valve member is positioned to provide a reasonably balanced mixture of hot and cold water, or when it is positioned to provide an excess of cold water, the auxiliary valve member 22 has no effect on the operation. However, when the duplex valve member is positioned to severely restrict or close off the supply of cold water, the auxiliary valve member 22 enters the orifice 23 and substantially closes it. There may be a small clearance between the auxiliary valve member 22 and the orifice 23, but even with such a clearance there will be substantial reduction from the normal maximum hot water flow-rate.

In this particular embodiment of the invention the provision of the auxiliary valve member 22 serves three purposes as explained below.

A. In the absence of the auxiliary valve member 22, the failure of the temperature responsive unit 21 could result in movement of the duplex valve member to its uppermost position, thereby completely cutting off the supply of cold water and allowing free flow of hot water. When the valve is supplying water to a shower, this could result in scalding of a person standing under the shower. In contrast, as a result of the provision of the auxiliary valve member 22 co-operating with the orifice 23, the supply of hot water would be substantially closed off, thereby greatly reducing the danger of scalding.

B. In the absence of the auxiliary valve member 22, and in the event of interruption followed by re-establishment of the hot water supply, a dangerous surge of hot water could come about as explained below. Due to the presence of cold water only during the interruption, the temperature responsive unit 21 would cause the duplex valve member 15 to move to a fully upward position thereby fully opening the hot water passage. Thus the supply of cold water would be substantially closed off. When the hot water supply were re-established, there would be surge of hot water from the valve before the temperature responsive unit could respond by increasing the cold water flow and reducing the hot water flow. This surge of hot water could be sufficient to cause scalding. In contrast, due to the presence of the auxiliary valve member 22 the hot water inlet would become substantially closed when the hot supply failed. Thus, there would be no sudden surge of hot water when the hot water supply were re-established, but instead the response of the temperature responsive unit 21 to the initial small quantity of hot water would partially open the cold water supply at the same time as, or before, the auxiliary valve member 22 caused the supply of hot water to be increased to a substantial flow.

C. It has been found that the provision of the auxiliary valve member 22 substantially reduces or even completely eliminates any tendency for sudden temporary changes in the temperature of the outlet water due to sudden changes in the hot or cold water supply pressure. In the absence of the auxiliary valve member 22 such temperature fluctuations do sometimes occur and it is believed that these are due to the finite response time for operation of the temperature responsive unit 21.

I claim:
1. A mixing valve for mixing first and second fluids, the valve comprising in combination
   1. an inlet for the first fluid,
   2. an inlet for the second fluid,
   3. an outlet for the mixed fluids,
   4. a main valve member located between said inlets and movable to vary fluid flow through each said inlet in inverse relation to fluid flow through the other inlet,
   5. control means including a thermostatic device connected to said main valve for controlling the position thereof to vary said fluid flow,
   6. an auxiliary valve member carried by said main valve member for movement therewith,
   7. said second inlet being located between said main valve member and said auxiliary valve member whereby fluid flow through said second inlet is controlled by said auxiliary valve member only when fluid flow through the first inlet falls below a predetermined rate after which fluid flow through the second inlet is controlled by said auxiliary valve in accordance with fluid flow through said first inlet, and
   8. further valve means operable by said control means for controlling the flow of fluid through said outlet.

2. A valve as claimed in claim 1 in which the said inlets face one another, in which the said main valve member is a duplex valve member movable normally to said inlets, and in which said first inlet includes a neck portion providing a seating for the said duplex valve member, said neck portion being located between said duplex valve member and said auxiliary valve member, said neck portion having first and second ends and being closable at said first end by said main valve member and at said second end by said auxiliary valve member.

3. A valve as claimed in claim 1 in which said thermostat device is located adjacent said outlet so as to sense the temperature of fluid in said outlet.

4. A valve as claimed in claim 3 wherein said control means also includes a manually operable control member, said thermostat device being disposed between the main valve member and said manually operable control member.

* * * * *